United States Patent
Lundell

(10) Patent No.: US 10,735,929 B2
(45) Date of Patent: Aug. 4, 2020

(54) SYSTEMS AND METHODS FOR AUTO-CONFIGURING A USER EQUIPMENT DEVICE WITH CONTENT CONSUMPTION MATERIAL

(71) Applicant: Rovi Guides, Inc., San Jose, CA (US)

(72) Inventor: Gregory James Lundell, Redwood City, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/845,179

(22) Filed: Dec. 18, 2017

(65) Prior Publication Data
US 2018/0176751 A1  Jun. 21, 2018

Related U.S. Application Data

(63) Continuation of application No. 13/794,292, filed on Mar. 11, 2013, now Pat. No. 9,848,276.

(51) Int. Cl.
*H04W 4/50*  (2018.01)
*H04L 29/08*  (2006.01)

(52) U.S. Cl.
CPC .............. *H04W 4/50* (2018.02); *H04L 67/306* (2013.01); *H04L 67/34* (2013.01)

(58) Field of Classification Search
CPC ......... H04W 4/50; H04L 67/306; H04L 67/34
USPC ....................................................... 709/222
See application file for complete search history.

(56) References Cited

U.S. PATENT DOCUMENTS

| | | | | |
|---|---|---|---|---|
| 6,496,979 B1* | 12/2002 | Chen | .......................... | G06F 8/61 |
| | | | | 717/178 |
| 8,768,775 B1* | 7/2014 | Roper | .................... | G06Q 30/01 |
| | | | | 235/375 |
| 2004/0006688 A1* | 1/2004 | Pike | .......................... | G06F 8/61 |
| | | | | 713/1 |
| 2006/0080659 A1* | 4/2006 | Ganji | ........................ | G06F 8/61 |
| | | | | 717/178 |
| 2006/0190410 A1* | 8/2006 | Harper | ..................... | G06F 21/10 |
| | | | | 705/59 |
| 2009/0106110 A1* | 4/2009 | Stannard | ................ | G06Q 30/00 |
| | | | | 705/14.1 |
| 2010/0088696 A1* | 4/2010 | Stoev | ...................... | H04L 67/34 |
| | | | | 717/178 |

(Continued)

FOREIGN PATENT DOCUMENTS

JP            2009-07106         9/2009

*Primary Examiner* — Nicholas R Taylor
*Assistant Examiner* — Chong G Kim
(74) *Attorney, Agent, or Firm* — Haley Guiliano LLP

(57) ABSTRACT

Methods and systems are provided for auto-configuring a newly purchased user equipment (UE) device with content consumption material that is associated with a user. These methods and systems are provided by way of receiving, in response to the user having purchased the UE device, purchase information (e.g., a credit card number) and a UE device identifier (e.g., a serial number of a purchased UE device). After receipt of this information, a database is searched to identify a user account that is associated with the purchase information. The user account identifies content consumption material that has been processed by other UE devices to enable the user to consume content. A communication is then transmitted to the UE device that causes the UE device to be configured with the identified content consumption material.

18 Claims, 9 Drawing Sheets

(56) References Cited

U.S. PATENT DOCUMENTS

| | | | |
|---|---|---|---|
| 2010/0175126 A1* | 7/2010 | Thomas | G06Q 30/0185 |
| | | | 726/17 |
| 2010/0311391 A1* | 12/2010 | Siu | H04W 8/205 |
| | | | 455/411 |
| 2012/0117558 A1* | 5/2012 | Futty | G06F 8/61 |
| | | | 717/176 |
| 2013/0073403 A1* | 3/2013 | Tuchman | G06Q 20/20 |
| | | | 705/16 |
| 2013/0173556 A1* | 7/2013 | Grigg | H04L 67/1095 |
| | | | 707/667 |
| 2014/0007084 A1* | 1/2014 | Ding | G06F 8/61 |
| | | | 717/178 |
| 2014/0179272 A1* | 6/2014 | Zhang | H04L 67/34 |
| | | | 455/411 |
| 2014/0201730 A1* | 7/2014 | Biswas | G06F 8/61 |
| | | | 717/178 |
| 2014/0316990 A1* | 10/2014 | Winston | G06F 9/4411 |
| | | | 705/44 |
| 2014/0344804 A1* | 11/2014 | Ein-Gal | H04L 67/10 |
| | | | 717/178 |
| 2016/0224334 A1* | 8/2016 | Sung | G06F 8/61 |

* cited by examiner

600

User Account Name: John Smith — 602

Purchase Information

| | |
|---|---|
| 4302 2604 9462 6739 | VISA |
| 14661232 | CITI BANK |

604

606

Login Information

| 608 Service | 610 User Name | 612 Password |
|---|---|---|
| Citi Bank | J Smith 1 | Potatoes 27 |
| Net Flix | J Smith 87 | I Heart Movies |
| ⋮ | ⋮ | ⋮ |

| 702 Device ID | 704 Make / Model | 706 Compatible Apps |
|---|---|---|
| A47629X6 | Apple iPhone 4S | Net Flix |
| | | HULU |
| | | iTunes |
| | | ⋮ |
| — | — | — |
| Bxyz47 | Samsung Chrome Book 1G | Google Plus |
| | | Sling Player |

FIG. 7

SYSTEMS AND METHODS FOR AUTO-CONFIGURING A USER EQUIPMENT DEVICE WITH CONTENT CONSUMPTION MATERIAL

CROSS-REFERENCE TO RELATED APPLICATION

This application is a continuation application of U.S. patent application Ser. No. 13/794,292, filed Mar. 11, 2013 (allowed), which is hereby incorporated by reference herein in its entirety.

BACKGROUND

It is commonplace for consumers to purchase and own multiple user equipment (UE) devices that share common capabilities such as a personal computer, a laptop computer, a tablet computer, a mobile telephone, and the like. These same consumers often subscribe to many services, each of which require separate usernames and passwords. Additionally, these same consumers often utilize multiple applications, such as streaming video applications and other applications.

While it is currently possible to install applications on a newly purchased UE device, and then import user information relating to that application to that newly purchased UE device, it is quite frustrating to have to do so for every new UE device one purchases, given the sheer amount of applications a typical purchaser uses.

SUMMARY

Methods and systems are provided herein for auto-configuring a newly purchased UE device with content consumption material that has been previously processed by other UE devices to enable the user to consume content. These methods and systems are provided by way of receiving, in response to the purchase of a UE device, purchase information (e.g., a credit card number), and a UE device identifier that is associated with the purchased UE device (e.g., a serial number of a purchased UE device). Upon receipt of this information, a database is searched to identify a user account based on the received purchase information. The user account might be identified by determining the identity of the credit card holder, and therefrom determining what subscriptions and applications the credit card holder uses on his or her other UE devices. The identified user account may identify content consumption material that has been processed by another UE device used by purchaser (e.g., an application used by the purchaser on an old computer) to enable the user to consume content. A communication may then be made to the purchased UE device based on the UE device identifier, such that the UE device is caused to be configured with the content consumption material identified by the user account.

In some embodiments, the content consumption material might include applications. A determination may be made as to which content consumption material associated with or identified by the user account is compatible with the newly purchased UE device. For example, some content consumption material on a purchaser's first UE device that operates using a first platform (e.g., Android device) may not be compatible with a second UE device that operates using a second platform (e.g., MacBook Air device). This determination might be made by accessing a database via a communications network to determine which content consumption material is compatible with the specific platform corresponding to a purchased UE device. For example, when a computer (e.g., a Samsung Chromebook) is purchased at a store, the purchaser's credit card information may be used to determine whether the purchaser has a user account. If the user does in fact have a user account, it may be determined that the user account includes information associated with a proprietary application that is not compatible with the platform that the purchased computer uses to operate (e.g., a product limited to UE devices created by Apple, such as iTunes, is not compatible with the Android platform).

After determining that the purchaser does in fact have a user account, a server may then transmit a communication to the UE device that causes the UE device to be configured with the content consumption material identified by the user account. The trigger that causes the server to transmit the communication may depend on varying conditions. For example, the server may transmit the communication when an indication is received that the UE device has been powered on for the first time, or that the UE device is set to default or factory settings. In another embodiment, the server may transmit the communication when an indication is received from the UE that includes a list of all user accounts associated with the UE, and a determination may be made that the purchaser's user account is not part of that list. Such indications may be received by periodically transmitting HELLO messages addressed to the UE device, where the addressing is based on the UE device identifier. When a response to the HELLO message is received, the server may determine therefrom that the purchased UE device has not been previously associated with the purchaser's user account. For example, when a newly purchased first device, such as a Samsung Chromebook, is turned on for the first time, the first device may hear a HELLO message and transmit an I'M HERE message, such that the server knows to transmit information associated with the purchaser's user account to the first device.

When identifying a user account, purchase information may be used to determine who the purchaser is. Purchase information may include the credit card number associated with the credit card used to make the purchase, a bank account number or debit card number from which funds were used to make the purchase, a username associated with a purchaser, an identifier of an entity that is configured to provide funds for completing the purchase, and a purchaser's home address. For example, when an online purchase of a UE device, such as a Samsung Chromebook, is made through an online vendor, such as www.amazon.com, by John Smith, whose username on www.amazon.com is jsmith12@gmail.com, a database may be accessed to identify that it was in fact John Smith who made the purchase, and to identify John Smith's user account. The user account may then be used to identify content consumption material that has been processed by another UE device that John Smith owns to enable John Smith to consume content. At this point, information associated with John Smith's user account may be easily transmitted to John Smith's new Samsung Chromebook based on the device identifier of the Samsung Chromebook, such as its serial number.

Content consumption material associated with or identified by John Smith's user account that John Smith would like on his new Samsung Chromebook may include usernames, passwords, user profile settings, device settings, and applications that John Smith likes to use. For example, when John Smith first turns on his new Samsung Chromebook, his Chromebook may be automatically configured with his usernames and passwords for sites he likes to use, such as online shopping websites, online banking websites, and any other website. Furthermore, John Smith's new Samsung Chromebook may also be auto-configured with applications that John Smith likes to use, such as YouTube, Fruit Ninja, and Spotify.

The manner in which the UE device is auto-configured may include the UE device processing the communication transmitted by the server to identify the content consumption material identified by the user account. For example, such processing may cause the UE to identify applications that the user has downloaded to another device. The UE device may then determine which applications associated with the identified content consumption material are not already configured on the UE device (e.g., determine whether one of the applications associated with the user account is pre-installed on the new UE device). The applications determined to not already be installed may be downloaded to the UE device, and the platform of the UE device may then be modified to include a module for each downloaded application. When the user selects a module, the corresponding downloaded application may be executed, such that the user is enabled to consume content using that application.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 shows an illustrative embodiment of a database entry that details fields associated with a user account, in accordance with some embodiments of the disclosure;

FIG. 7 shows an illustrative embodiment of a database entry that details associations between UE device identifiers, makes and models of UE devices, and which content consumption material is compatible with those UE devices, in accordance with some embodiments of the disclosure;

DETAILED DESCRIPTION OF EMBODIMENTS

Figure 1:
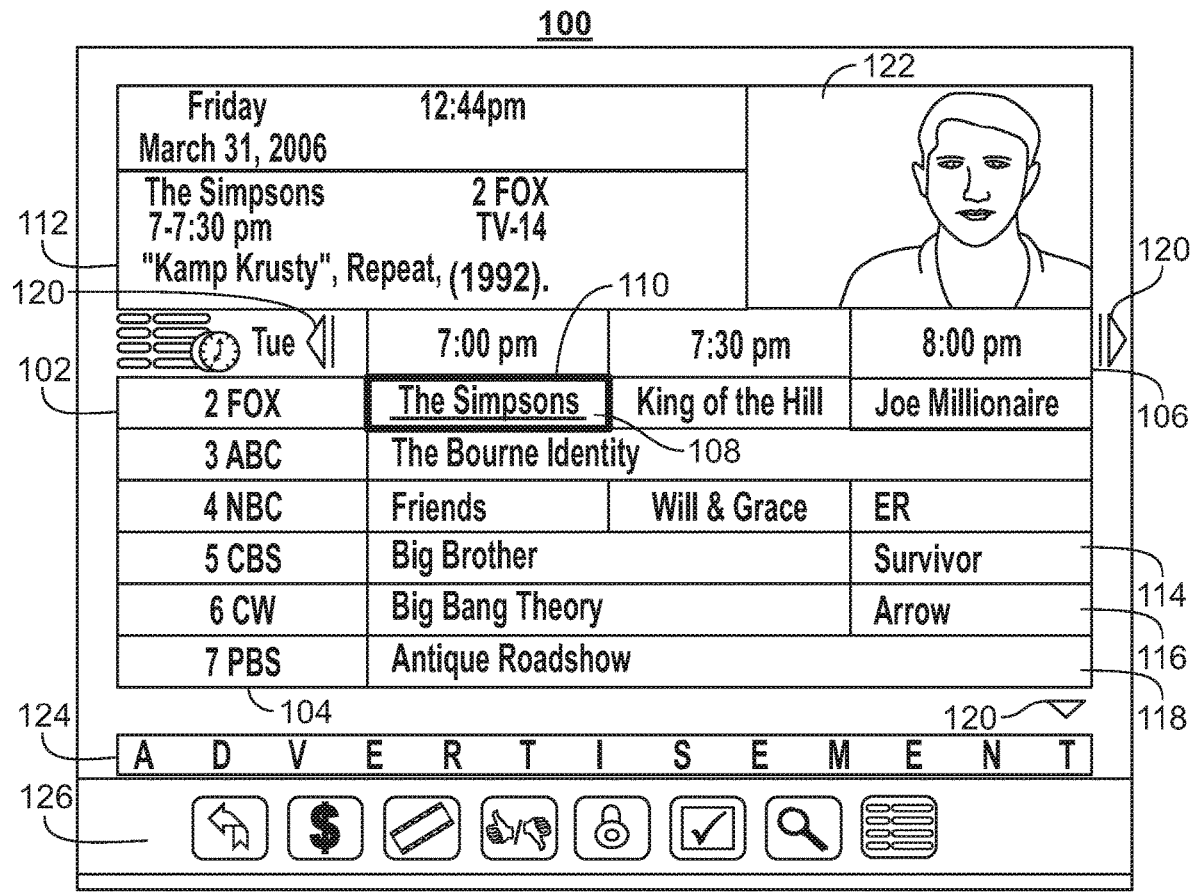
FIG. 1 shows an illustrative embodiment of a display screen that may be used to provide media guidance application listings and other media guidance information, in accordance with some embodiments of the disclosure.

Methods and systems are provided herein for auto-configuring a newly purchased UE device with content consumption material specific to a purchaser. These methods and systems are provided by way of receiving, in response to the purchase of a UE device, purchase information (e.g., a credit card number) and a UE device identifier (e.g., a serial number of a purchased UE device). Upon receipt of this information, a database is searched to identify a user account based on the purchase information. The user account might be identified by determining the identity of the credit card holder, and what content consumption material the credit card holder uses on his or her other devices may be determined therefrom. A communication may then be automatically transmitted to the UE device, based on the UE device identifier, to cause the UE device to be configured with the content consumption material.

The term "device identifier" wherever used in this disclosure refers to any form of identifier that uniquely identifies a UE device. This may be a serial number, an IP address, a unique indicator, a MAC address, or the like. The terms "device identifier" and "device ID" are used interchangeably in the disclosure, and carry the same definition.

The term "content consumption material" wherever used in this disclosure refers to any material that enables a user to access content, such as usernames, handles, passwords, PIN numbers, and the like that a user uses to log in to or access websites, bank accounts, or other restricted or unrestricted entities. Content consumption material may also include applications, subscriptions, and the like.

The term "user account" wherever used in this disclosure refers to an account that may include or provide an indication of content consumption material associated with a user.

The term "platform" wherever used in this disclosure refers to a hardware architecture and/or software framework that allows software, such as application software. A platform may include an operating system, a computer architecture, a programming language and/or related user interface, and the like.

The term "application" wherever used in this disclosure refers to any form of stand-alone software. Such software may be self-contained and may execute by itself. Accordingly, such software may be able to execute on a device of any platform with little to no modification. The application is executable by the operating system independently of any other software running at the given time on the device. An application may be an over-the-top (OTT) application.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2A:
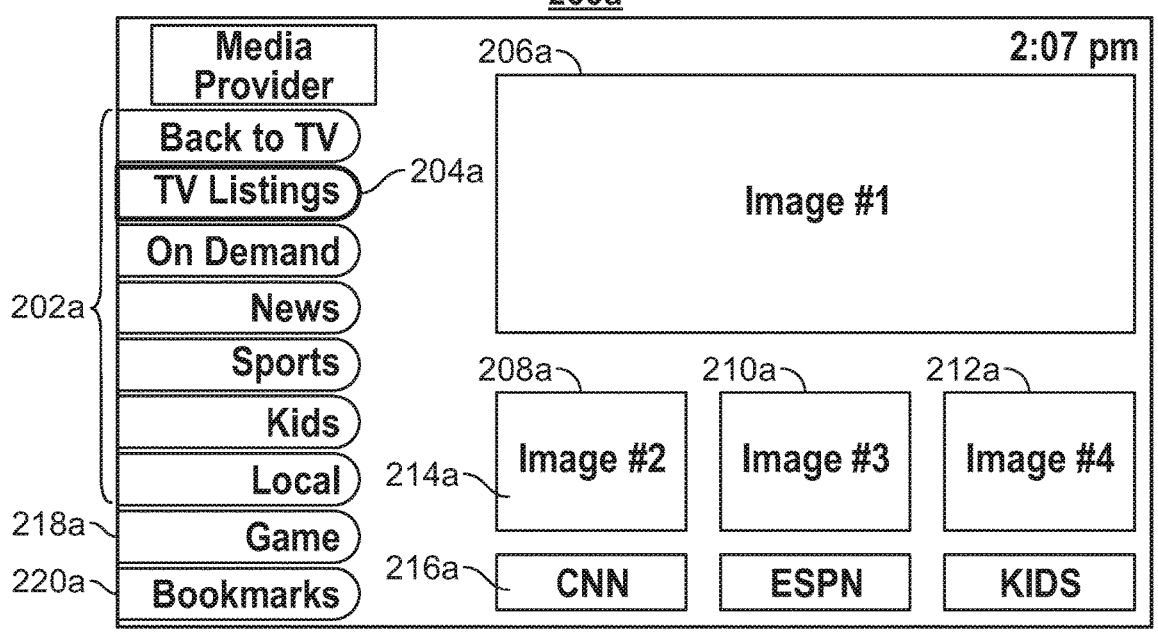
FIG. 2A shows another illustrative embodiment of a display screen that may be used to provide media guidance application listings, in accordance with some embodiments of the disclosure.
Figure 2B:
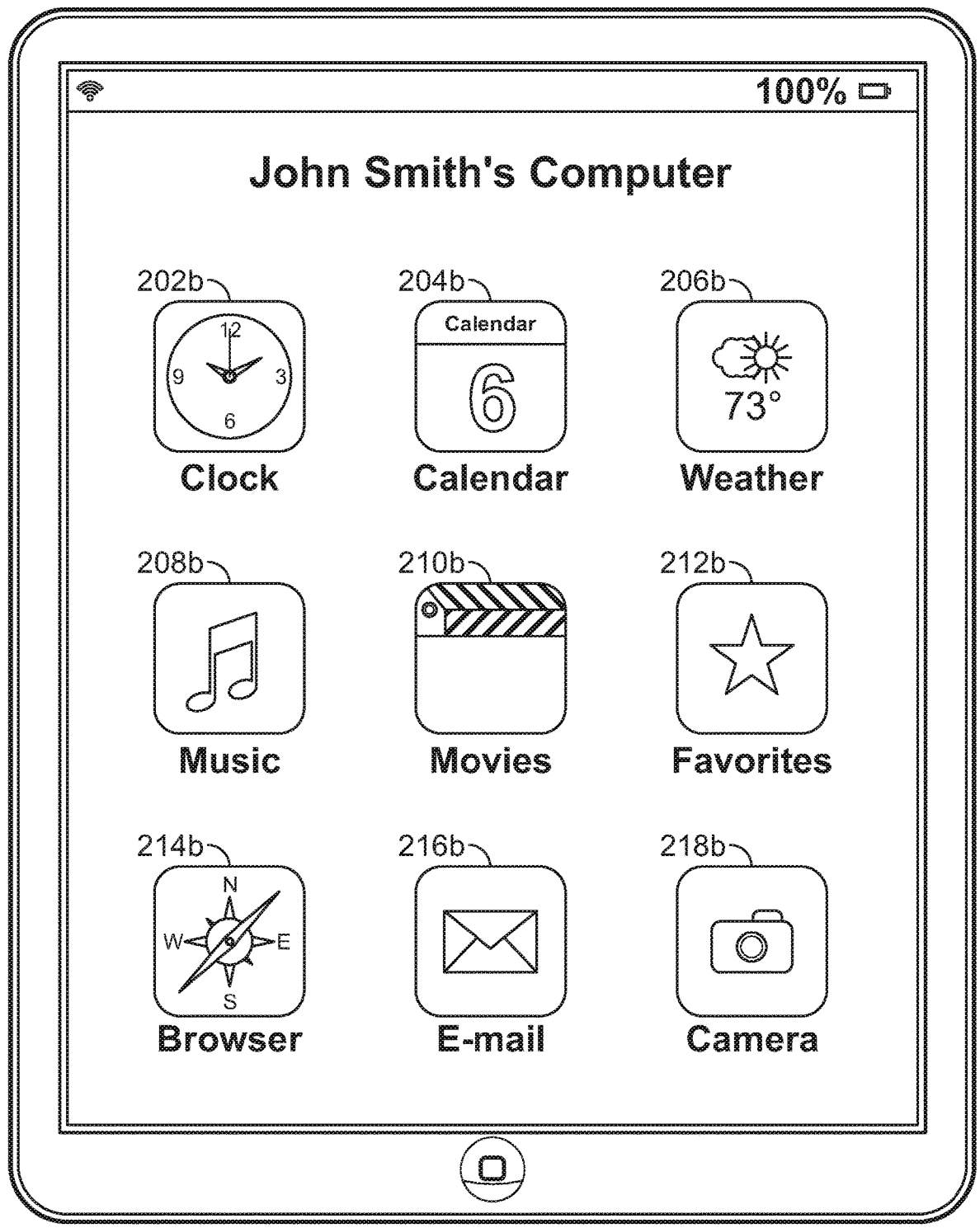
FIG. 2B shows another illustrative embodiment of a display screen that may be used to provide content consumption material, in accordance with some embodiments of the disclosure.

FIGS. 1-2 (including FIG. 2A and FIG. 2B) show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, user account information, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, options to create or modify a user account, options to auto-configure or auto-configure a UE device based on information associated with a user account, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. User preferences may be determined based on information associated with a user account, and may include OTT applications. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties. Information obtained or gathered with regard to all user profiles mentioned in the foregoing may also be used to compile information relating to a user account. The user account may be automatically modified based on the compiled information, or the media guidance application may allow the user to choose to modify the account based on the compiled information, perhaps by prompting the user to do so.

Another display arrangement for providing media guidance is shown in FIG. 2A. Video mosaic display 200a includes selectable options 202a for content information organized based on content type, genre, and/or other organization criteria. In display 200a, television listings option 204a is selected, thus providing listings 206a, 208a, 210a, and 212a as broadcast program listings. In display 200a the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208a may include more than one portion, including media portion 214a and text portion 216a. Media portion 214a and/or text portion 216a may be selectable to view content in full-screen or to view information related to the content displayed in media portion 214a (e.g., to view listings for the channel that the video is displayed on).

The listings in display 200a are of different sizes (i.e., listing 206a is larger than listings 208a, 210a, and 212a), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

FIG. 2B shows another illustrative embodiment of a display screen that may be used to provide content consumption material, in accordance with some embodiments of the disclosure. Modules 202b, 204b, 206b, 208b, 210b, 212b, 214b, 216b, and 218b within display 200b each correspond to applications. For example, module 202b corresponds to a clock application. Applications corresponding to the modules may be customizable by a user. For example, favorites module 212 and/or e-mail module 216 may correspond to a favorite application that corresponds to a user, such as user 501a. The background of display 200b may also be customizable, such as by a wallpaper set by user 501a.

Figure 3:
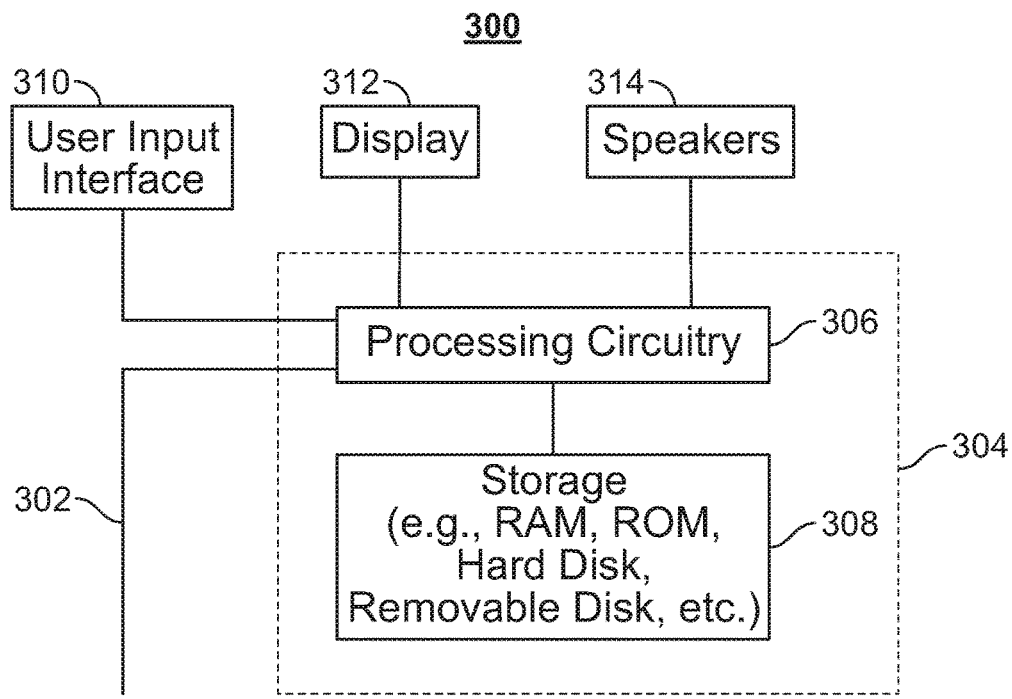
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
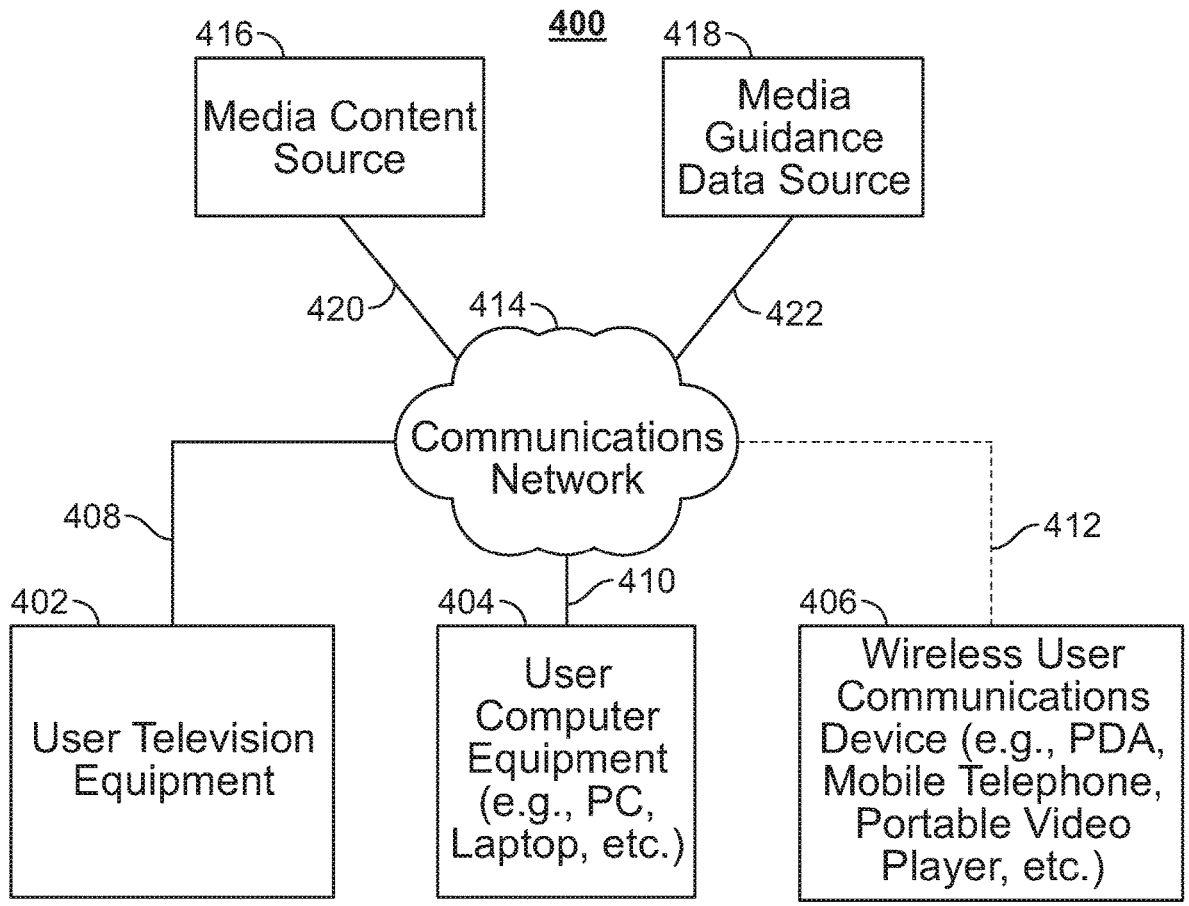
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. A user may also set user account information, such as login information, as a setting to be maintained across in-home devices and remote devices. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, when a user purchases a UE device from a first entity, a server receives a UE device identifier, such as a serial number, and purchase information, such as a credit card number. The server then queries a database to determine whether a user account associated with the information associated with the purchase exists. If a user account does not exist, the server may cause a user to be offered an opportunity to create a user account. If a user account does exist, the server may identify the user account, such that content consumption material processed by the user's other UE devices to enable the user to access content may be auto-configured on the newly purchased UE device.

In some embodiments, the first entity may have any and all information required to identify content consumption material associated with or identified by a user account, and/or content consumption material that is associated with a UE device that is purchased from the first entity. For example, in the event the first entity is Apple, and a UE device such as an iPad is purchased from Apple, a purchaser who already has a user account associated with, for example, an Apple ID, may already have their preferences known to Apple. In such an example, Apple may auto-configure the iPad to include all information associated with the purchaser's user account, and may be able to do so without querying one or more databases to determine content consumption material associated with or identified by the user account and/or content consumption material that is compatible with the purchased UE device.

Figure 5A:
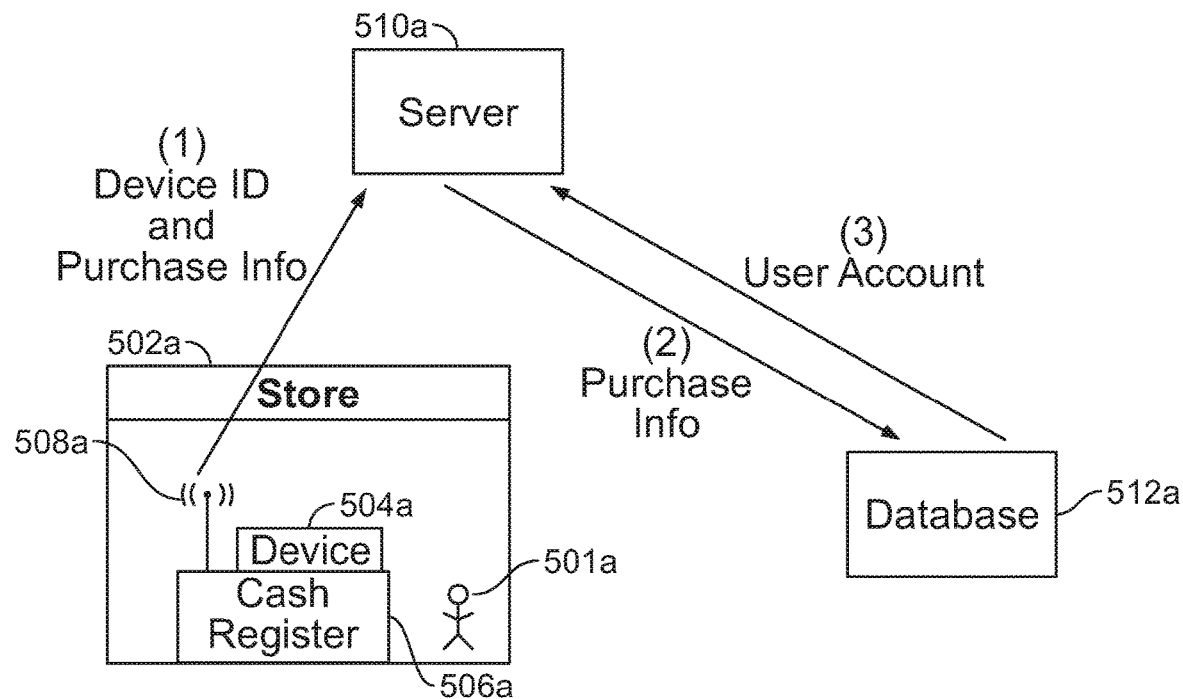
FIG. 5A shows an illustrative embodiment of a system that may identify a user account based on information obtained when a device is purchased, in accordance with some embodiments of the disclosure.

FIG. 5A shows an illustrative embodiment of a system that may identify a user account based on information obtained when a device is purchased, in accordance with some embodiments of the disclosure. In FIG. 5A, user 501a is at store 502a purchasing UE device 504a at cash register 506a. This embodiment is merely illustrative, as the purchase may occur outside of a physical store, such as electronically through an online vendor. In such an instance, cash register 506a may be an online transaction broker, such as PayPal, or any other service that facilitates transactions, whether owned or operated by the online vendor or through an independent transaction broker. The purchase may also occur outside of either of these environments, such as in a non-retail transaction (e.g., a private transaction between individuals). In such an instance, cash register 506a may again be an online transaction broker, such as PayPal, or any other service that facilitates transactions, whether owned or operated by the online vendor or through an independent transaction broker, and whether physical or virtual. Cash register 506a may include the functionality of device 300.

When UE device 504a is purchased, control circuitry 304 determines a UE device ID and purchase information. Control circuitry 304 may determine the device ID automatically or manually. Automatic determination may occur when an SKU number, a bar code, a QC code, or any other type of scannable number is entered or scanned into cash register 506a. Control circuitry 304 may also automatically determine the UE device ID by accessing a database, such as an inventory or warehouse database, to determine a unique identifier associated with a purchased item. For example, when purchasing a UE device via an online vendor, control circuitry 304 of the vendor may access a database to determine the UE device ID of the purchased item. Such database access may occur by using any known query language to access the database, such as SQL. Manual determination may occur by a cashier manually entering in a UE device ID, perhaps in response to an on-screen prompt at cash register 506a. Manual determination also may occur after the transaction, such as by manual registration by user 501a. Manual determination may be made in response to user input via user input interface 310.

Purchase information may include information that at least serves to identify user 501a, such as a credit card number, a debit card number, a bank account number, an identifier associated with an e-wallet, such as Google Wallet or PayPal, personal information given to a cashier such as one's name, address, telephone number, and/or any other information that relates to or can be used to identify purchaser 501a. In the case of an electronic purchase, the purchase information may include an IP address, a MAC address of the device used to make the purchase, an identifier assigned by an online vendor, a login identifier or handle, and/or any other information that may serve to identify the purchaser of the device. The term "purchase information" is hereafter used interchangeably with the term "information associated with the purchase" and carries the same definition.

Purchase information may be determined automatically or manually. Automatic determination of purchase information may include automatically determining an account number associated with an instrument of payment at the time payment is made. For example, an account number associated with a magnetic stripe that is read through a magnetic stripe or card reader, such as a credit card reader, may be determined. Automatic determination may occur by way of processing circuitry 306. Manual determination of purchase information may occur at cash register 506a by a cashier manually entering information that identifies a user, such as a name, an address, and/or a telephone number, perhaps via user input interface 310.

Control circuitry 304 may transmit the UE device ID and the purchase information to server 510a over communications network 414 by way of transmitter 508a. Server 510a may be located locally or remote from cash register 506a. Server 510a may include all functionality of UE device 300. Server 510a may be associated with and/or operated by a vendor that provides user accounts. When server 510a receives the UE device ID and the purchase information, server 510a transmits the purchase information to database 512a. This transmission may occur by using any known query language, such as SQL, to generate a query addressed to database 512a. In some instances, database 512a is co-located with server 510a. In some instances, database 512a and server 510a are one integrated device. In some instances, database 512a and server 510a are located remotely from one another. The contents and details pertaining to database 512a are described below with respect to FIG. 6 and FIG. 7.

Upon receiving the transmission including the purchase information, database 512a determines whether a user account associated with the purchase information exists. If a user account does not exist, database 512a transmits an indication to server 510a that a user account does not exist. Server 510a may subsequently transmit to UE device 504a an indication that a user account associated with user 501a does not exist, such that UE device 504a is caused to offer user 501a an opportunity to set up a new user account. Such an opportunity may require a payment of a fee, or a commitment to pay recurring fees, as consideration for setting up the new user account.

If a user account associated with the purchase information does exist, database 512a identifies which user account corresponds to the purchase information. The details associated with this identification are described below with respect to FIG. 6 and FIG. 7. If a user account associated with the purchase information does exist, database 512a may transmit an identifier associated with the user account (e.g., an account identifier) to server 510a. Database 512a may include the functionality of UE device 300, and may determine and transmit the information associated with the determined user account by using control circuitry 304. Information within the database may be stored in storage 308. As will be described with regard to FIG. 5B, server 510a may cause UE device 504a to become auto-configured by transmitting information associated with the user account to device 504a.

In some embodiments, when a user account associated with a user is identified, the server may access a database to determine which content consumption material should be provided to the purchased UE device. In some embodiments, the first entity may already be aware of all content consumption material associated with or identified by the user account, as discussed above. For example, if the first entity is Apple, and the purchased UE device is an Apple product, then Apple may already know all content consumption material that is compatible with the device and is associated with the user account, and may cause the purchased UE device to be auto-configured based on that information.

Figure 5B:
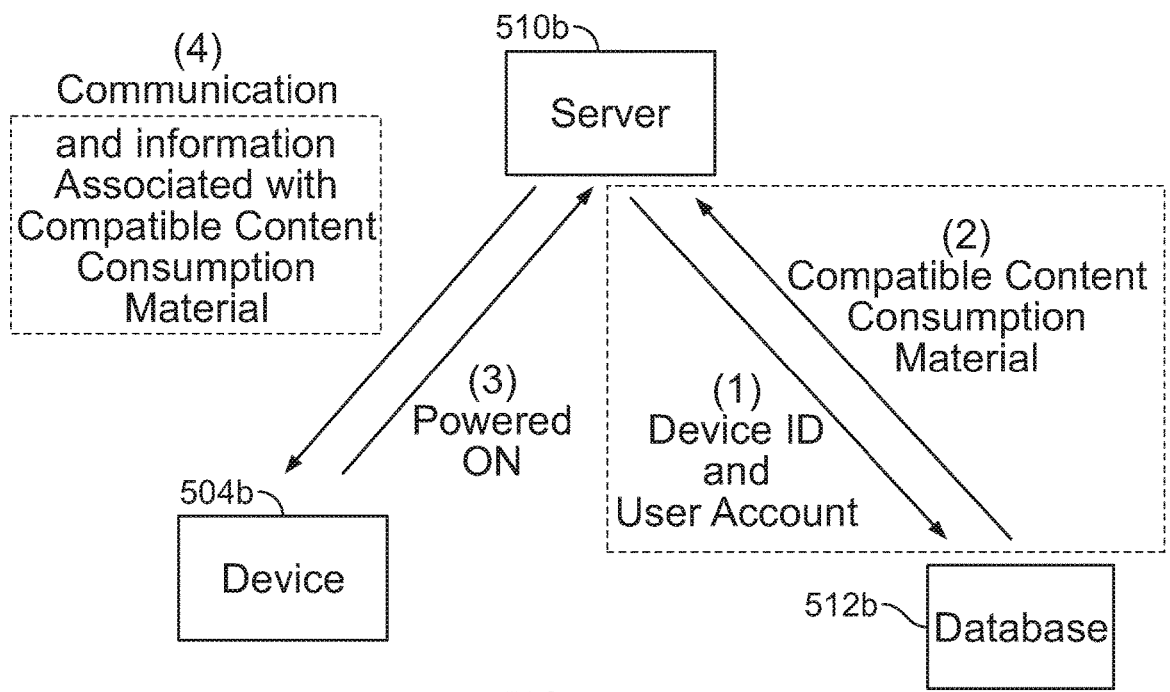
FIG. 5B shows an illustrative embodiment of a system that may identify content consumption material associated with or identified by a user account that are compatible with a newly purchased UE device, in accordance with some embodiments of the disclosure.

FIG. 5B shows an illustrative embodiment of a system that may identify content consumption material associated with or identified by a user account that is compatible with a newly purchased UE device, in accordance with some embodiments of the disclosure. After identifying the user account of the purchaser, as described in the foregoing with regard to FIG. 5A, server 510b may query database 512b as to what content consumption material is associated with the user account that is also compatible with UE device 504b. This query may be performed via SQL, or any other known query language or means of exchanging information with a database. This query may be sent concurrently, or sequentially, with other queries recited in the foregoing, and the queries may be sent in no particular order. Database 512*b* may use the user account information in conjunction with the UE device identifier to determine a platform associated with UE device 504*b*. The platform associated with UE device 504*b* may be related to the first entity. Database 504*b* may utilize the determined platform to acquire a list of content consumption material compatible with that platform. Database 504*b* may narrow the acquired list to include only content consumption material on the list that is associated with the user account, including content consumption material that was purchased and/or owned by user 501*a* and installed on other UE devices. Database 512*b* may then transmit the final list to server 510*b*. In some embodiments, where UE device 504*b* is purchased from the first entity, and the first entity is restricted to a first platform, there may be no need to check which content consumption material associated with or identified by the user account is compatible with UE device 504*a*, since the first entity already knows what content consumption material is compatible. In such a case, content consumption material associated with or identified by the user account may be installed without the cross-referencing described with regard to FIG. 6 and FIG. 7. In some embodiments, where UE device 504*a* is purchased from a vendor such as store 502, UE device 502 may need to access one or more servers associated with either or both of store 502*a* and the first entity. It is noted that determining content consumption material compatibility with the purchased UE device is optional.

In some embodiments, user 501*a* may access a website to manage user 501*a*'s user account. From this website, user 501*a* may access a list of content consumption material associated with the user account. User 501*a* may specify what content consumption material on the list will be configured on UE device 504*b*, perhaps by checking or unchecking boxes associated with each content consumption material. The list may or may not be confined to content consumption material that is compatible with UE device 504*b*. If the website is accessed before the time of purchase or the time of configuration of UE device 504*b*, user 501*a* may specify that user 501*a*'s selections are to be applied to a next purchased device. After the time of configuration of UE device 504*b*, user 501*a* may manage the content consumption material on UE device 504*b* through the website. For example, user 501*a* may select previously unselected content consumption material, such that UE device 504*b* is configured to enable access to the newly selected content consumption material. Similarly, user 501*a* may unselect previously selected content consumption material, such that UE device 504*b* is configured to remove access to the newly unselected content consumption material. The list may be continually updated to reflect additions or deletions of content consumption material associated with the user account.

In some embodiments, after determining what, if any, of the content consumption material associated with or identified by the user account is compatible with UE device 504*b*, server 510*b* may then wait to receive an indication that UE device 504*b* is to be configured with the content consumption material identified by the user account. Such an indication may include an indication that the device has been powered on for the first time, an indication that the device is currently set to default or factory settings, an indication that UE device 504*b* is accessing a network, such as the Internet, for the first time, an indication that a new or additional user login has been registered to UE device 504*b* for the first time, an indication of receipt of a user request to auto-configure UE device 504*b*, and the like.

In some embodiments, in order to ensure that an indication that UE device 504*b* is to be auto-configured is received by server 510*b*, UE device 504*b* may be configured to proactively send a request to server 510*b*. In some embodiments, UE device 504*b* may be configured to send this request upon determining that UE device 504*b* has been turned on for the first time, upon determining that a new account has been registered to UE device 504*b*, or upon determining that a user request to auto-configure UE device 504*b* is received. In some embodiments, UE device 504*b* may be configured to send this request upon determining a new user account has been created.

In some embodiments, in order to ensure that an indication that UE device 504*b* is to be auto-configured is received by server 510*b*, server 510*b* may send HELLO messages to UE device 504*b* periodically until server 510*b* receives an indication that the device has been, for example, powered on for the first time, such as an I'M HERE message. The HELLO messages may be addressed to device 504*b* based on the device ID associated with device 504*b*. The HELLO messages may be transmitted to device 504*b* via communications network 414. The HELLO messages may be caused to be transmitted by control circuitry 304. The I'M HERE message may be transmitted to server 510*b* via communications network 414, and may be caused to be transmitted by control circuitry 304.

In some embodiments, upon receiving an indication that device 504*b* is to be auto-configured, server 510*b* may transmit information associated with the user account to device 504*b* if control circuitry 304 has determined that a user account exists. If a compatibility determination was made, then server 510*b* may transmit information relating to some or all compatible content consumption material associated with or identified by the user account to UE device 504*b*. Such transmission may be performed over communications network 414, and may be caused to be transmitted by control circuitry 304. UE Device 504*b* may then process the information using processing circuitry 306 to access installation or configuration information associated with the content consumption material. In some embodiments, UE device 504*b* may download installation information associated with the content consumption material from server 510*b*. In some embodiments, UE device 504*b* may download installation information associated with the content consumption material from one or more different servers, such as from providers of the content consumption material. When processing the information, UE device 504*b* may cause server 510*b*, or a different server, which may be located locally or remotely from UE device 504*b* and/or server 510*b*, to transmit the installation information to UE device 504*b*. In some embodiments, UE device 504*b* may automatically install the content consumption material upon receiving the installation or configuration information. In other embodiments, UE device 504*b* may prompt user 501*a* via display 312 to select what content consumption material, if any, of the identified content consumption material, to install. Such a prompt may be provided as a list, where user 501*a* may check or uncheck boxes associated with each content consumption material and then press a submit button (e.g., via user input interface 310).

In some embodiments, a user may purchase a UE device from a third party vendor, such as a physical retail store like Best Buy, or an online vendor like www.amazon.com, as opposed to the user purchasing a UE device from a first entity like Apple. In such embodiments, a server may receive, from the vendor, a UE device identifier, such as a serial number, and the server also receives purchase information, such as a credit card number. The server then queries a database to determine whether a user account associated with the purchase information exists. If a user account does not exist, the vendor may offer an opportunity to the purchaser to create a user account in order to auto-configure the purchased UE device. If a user account does exist, the server may identify the user account, such that content consumption material processed by the user's other UE devices to enable the user to consume content may be auto-configured on the newly purchased UE device. When the UE device is purchased from a third party vendor, as opposed to from a first entity, the UE device or the vendor may need to query databases that the first entity does not need to query in order to auto-configure the UE device.

FIG. 5A shows an illustrative embodiment of a system that may identify a user account based on information obtained when a device is purchased, in accordance with some embodiments of the disclosure. In FIG. 5A, user 501a is at store 502a purchasing UE device 504a at cash register 506a. This embodiment is merely illustrative, as the purchase may occur outside of a physical store, such as electronically through an online vendor. In such an instance, cash register 506a may be an online transaction broker, such as PayPal, or any other service that facilitates transactions, whether owned or operated by the online vendor or through an independent transaction broker. The purchase may also occur outside of either of these environments, such as in a non-retail transaction (e.g., a private transaction between individuals). In such an instance, cash register 506a may again be an online transaction broker, such as PayPal, or any other service that facilitates transactions, whether owned or operated by the online vendor or through an independent transaction broker, and whether physical or virtual. Cash register 506a may include the functionality of device 300.

When UE device 504a is purchased, control circuitry 304 determines a UE device ID and purchase information. Control circuitry 304 may determine the UE device ID automatically or manually. Automatic determination may occur when an SKU number, a bar code, a QC code, or any other type of scannable number is entered or scanned into cash register 506a. Control circuitry 304 may also automatically determine the UE device ID by accessing a database, such as an inventory or warehouse database, to determine a unique identifier associated with a purchased item. For example, when purchasing a UE device via an online vendor, control circuitry 304 of the vendor may access a database to determine the device ID of the purchased item. Such database access may occur by using any known query language to access the database, such as SQL. Manual determination may occur by a cashier manually entering in a UE device ID, perhaps in response to an on-screen prompt at cash register 506a. Manual determination also may occur after the transaction, such as by manual registration by user 501a. Manual determination may be made in response to user input via user input interface 310.

Purchase information may include information that at least serves to identify user 501a, such as a credit card number, a debit card number, a bank account number, an identifier associated with an e-wallet, such as Google Wallet or PayPal, personal information given to a cashier such as one's name, address, telephone number, and/or any other information that relates to or can be used to identify purchaser 501a. In the case of an electronic purchase, the purchase information may include an IP address, a MAC address of the device used to make the purchase, an identifier assigned by an online vendor, a login identifier or handle, and/or any other information that may serve to identify the purchaser of the device.

Purchase information may be determined automatically or manually. Automatic determination of purchase information may include automatically determining an account number associated with an instrument of payment at the time payment is made. For example, an account number associated with a magnetic stripe that is read through a magnetic stripe or card reader, such as a credit card reader, may be determined. Automatic determination may occur by way of processing circuitry 306. Manual determination of purchase information may occur at cash register 506a by a cashier manually entering information that identifies a user, such as a name, an address, and/or a telephone number, perhaps via user input interface 310.

Control circuitry 304 may transmit the UE device ID and the purchase information to server 510a over communications network 414 by way of transmitter 508a. Server 510a may be located locally or remote from cash register 506a. Server 510a may include all functionality of UE device 300. Server 510a may be associated with and/or operated by a vendor that provides user accounts. When server 510a receives the device ID and the purchase information, server 510a transmits the purchase information to database 512a. This transmission may occur by using any known query language, such as SQL, to generate a query addressed to database 512a. In some instances, database 512a is co-located with server 510a. In some instances, database 512a and server 510a are one integrated device. In some instances, database 512a and server 510a are located remotely from one another. The contents and details pertaining to database 512a are described below with respect to FIG. 6 and FIG. 7.

Upon receiving the transmission including the purchase information, database 512a determines whether a user account associated with the purchase information exists. If a user account does not exist, database 512a transmits an indication to server 510a that a user account does not exist. Server 510a may subsequently transmit to the vendor (e.g., store 502a) an indication that a user account associated with user 501a does not exist, such that the vendor may offer user 501a an opportunity to set up a new user account. Such an opportunity may require a payment of a fee, or a commitment to pay recurring fees, as consideration for setting up the new user account.

If a user account associated with the purchase information does exist, database 512a identifies which user account corresponds to the purchase information. The details associated with this identification are described below with respect to FIG. 6 and FIG. 7. If a user account associated with the purchase information does exist, database 512a may transmit an identifier associated with the user account (e.g., an account identifier) to server 510a. Database 512a may include the functionality of UE device 300, and may determine and transmit the information associated with the determined user account by using control circuitry 304. Information within the database may be stored in storage 308. As will be described with regard to FIG. 5B, server 510a may cause UE device 504a to become auto-configured by transmitting information associated with the user account to device 504a, or to store 502a, which will then utilize that information to auto-configure UE device 504a. In some embodiments, server 510a may allow store 502a to download information associated with a user account that is associated with user 501a, such that store 502a may cause user 501a to receive a token that can be used to auto-configure UE device 504a. In some embodiments, the token may include a USB key, a SmartCard, an SD card, a mini-SD card, a hard drive (internal or external), or any other component capable of storing and/or transferring information that enables user 501a to cause UE device 504a to be auto-configured. In some embodiments, the token may be login information that user 501a may use to access user account information via UE device 504a, such that UE device 504a may be auto-configured upon accessing the user account information.

In some embodiments, when a user account associated with a user is identified, the server may access a database to determine what content consumption material should be provided to the purchased UE device. The server may determine that all content consumption material associated with or identified by the user account should be provided to the UE device, or the server may determine that only some content consumption material associated with or identified by the user account should be provided to the UE device (e.g., content consumption material that is compatible with the UE device). The server may provide information associated with the determined content consumption material to the UE device or to the vendor upon determining that the UE device is to be auto-configured.

FIG. 5B shows an illustrative embodiment of a system that may identify content consumption material associated with or identified by a user account that is compatible with a newly purchased UE device, in accordance with some embodiments of the disclosure. After identifying the user account of the purchaser, as described in the foregoing with regard to FIG. 5A, server 510b may query database 512b as to what content consumption material associated with or identified by the user account is also compatible with UE device 504b. This query may be performed via SQL, or any other known query language or means of exchanging information with a database. This query may be sent concurrently, or sequentially, with other queries recited in the foregoing, and the queries may be sent in no particular order. Database 512b may use the user account information in conjunction with the UE device identifier to determine a platform associated with UE device 504b. Database 512b may utilize the determined platform to acquire a list of content consumption material compatible with that platform. Database 512b may narrow the acquired list to include only content consumption material on the list that is associated with the user account. The results of the query might cause the server to determine, for example, that UE device 504b is a video game console, and that a ringtone application associated with the user account is not compatible with the video game console. It is noted that determining content consumption material compatibility with the purchased UE device is optional.

In some embodiments, user 501a may access a website to manage user 501a's user account. From this website, user 501a may access a list of content consumption material associated with the user account. User 501a may specify what content consumption material on the list will be configured on UE device 504b, perhaps by checking or unchecking boxes associated with each content consumption material. The list may or may not be confined to content consumption material that is compatible with UE device 504b. If the website is accessed before the time of purchase or the time of configuration of UE device 504b, user 501a may specify that user 501a's selections are to be applied to a next purchased device. After the time of configuration of UE device 504b, user 501a may manage the content consumption material on UE device 504b through the website. For example, user 501a may select previously unselected content consumption material, such that UE device 504b is configured to enable access to the newly selected content consumption material. Similarly, user 501a may unselect previously selected content consumption material, such that UE device 504b is configured to remove access to the newly unselected content consumption material. The list may be continually updated to reflect additions or deletions of content consumption material associated with the user account.

In some embodiments, after determining what, if any, of the content consumption material associated with or identified by the user account is compatible with UE device 504b, server 510b may then wait to receive an indication that UE device 504b is to be auto-configured. Such an indication may include an indication that the device has been powered on for the first time, an indication that the device is currently set to default or factory settings, an indication that UE device 504b is accessing a network, such as the Internet, for the first time, an indication that a new or additional user login has been registered to UE device 504b for the first time, an indication of receipt of a user request to auto-configure UE device 504b, and the like.

In some embodiments, in order to ensure that an indication that UE device 504b is to be auto-configured is received by server 510b, UE device 504b may be configured to send a request to server 510b inquiring as to whether UE device 504b is to be configured with respect to a particular user account. In some embodiments, UE device 504b may be configured to send this request upon determining that UE device 504b has been turned on for the first time, upon determining that a new user account associated with user 501a has been registered to UE device 504b, or upon determining that a user request to auto-configure UE device 504b has been received. In some embodiments, UE device 504b may be configured to send this request upon determining a new user account has been created.

In some embodiments, in order to ensure that an indication that UE device 504b is to be auto-configured is received by server 510b, server 510b may send HELLO messages to UE device 504b periodically until server 510b receives an indication that the device has been, for example, powered on for the first time, such as an I'M HERE message. The HELLO messages may be addressed to UE device 504b based on the device ID associated with UE device 504b. The HELLO messages may be transmitted to device 504b via communications network 414. The HELLO messages may be caused to be transmitted by control circuitry 304. The I'M HERE message may be transmitted to server 510b via communications network 414, and may be caused to be transmitted by control circuitry 304.

In some embodiments, upon receiving an indication that UE device 504b is to be auto-configured, server 510b may transmit information associated with the user account to UE device 504b if control circuitry 304 has determined that a user account exists. If a compatibility determination was made, then server 510b may transmit information relating to some or all compatible content consumption material associated with or identified by the user account to UE device 504b. Such transmission may be performed over communications network 414, and may be caused to be transmitted by control circuitry 304. UE device 504b may then process the information using processing circuitry 306 to access installation or configuration information associated with the content consumption material. In some embodiments, UE device 504b may download installation information associated with the content consumption material from server

510b. In some embodiments, UE device 504b may download installation information associated with the content consumption material from one or more different servers, such as from providers of the content consumption material. When processing the information, UE device 504b may cause server 510b, or a different server, which may be located locally or remotely from UE device 504b and/or server 510b, to transmit the installation information to UE device 504b. In some embodiments, UE device 504b may automatically install the content consumption material upon receiving the installation or configuration information. In other embodiments, UE device 504b may prompt user 501a via display 312 to select what content consumption material, if any, of the identified content consumption material, to install. Such a prompt may be provided as a list, where user 501a may check or uncheck boxes associated with each content consumption material and then press a submit button (e.g., via user input interface 310).

In some embodiments, the database may contain entries corresponding to information associated with a user account. The entries may include a user account name, as well as any information associated with a user account. The information associated with the user account may include purchase information, such as credit card numbers and bank account numbers associated with a user. The information associated with the user account may also include login information that corresponds to various services. The login information may include usernames and passwords that correspond to the service. Other information that may be associated with a user account may include a list of applications associated with the user account.

FIG. 6 shows an illustrative embodiment of a database entry that details fields associated with a user account, in accordance with some embodiments of the disclosure. Database entry 600 may include a user account name 602, purchase information 604, and login information 606. Database entry 600 may include additional fields, such as content consumption material associated with or identified by the user account, UE devices associated with the user account, specific content consumption material installed on each or any of the UE devices associated with the user account, and the like. In this case, the user account belongs to John Smith, as shown in item 602. Item 604 depicts purchase information associated with John Smith's user account. For example, a credit card number and a bank account number associated with John Smith appear in this entry; however, any type of purchase information as defined in the foregoing may form a part of this entry. Item 606 depicts login information. Login information 606 may include a user name 610, a password 612, and a corresponding service 608. In some instances, a password is not needed to access a service, and therefore no corresponding password will be filled in for that service. Service 608 may be any type of service that corresponds to content consumption material, including but not limited to a banking service, a media service, a personal organization service, a calendar service, or any other type of service.

In some embodiments, a user may manually enter and delete information from his or her user account. This may be performed via user input interface 310. The user may manipulate information within his or her user account through a secure website or through a dedicated application. The user may manipulate information within his or her user account by speaking to an agent associated with his or her user account and requesting the information be changed by a telephone, chat, or instant message service, or by interacting with such an agent in person. In some embodiments, a service providing the user account may automatically detect information, such as purchase information, login information, or installed content consumption material on UE device 504a. This may be detected whenever a user logs into a service or installs content consumption material that is not currently part of the user account, or when a user uses a means of payment that is not within purchase information field 604 of his or her user account.

In some embodiments, such information may be automatically added to the user account, and in other embodiments a user may manually add this information to his or her user account. The user may be prompted via display 312 each time the provider of the user account detects information that is suited to entry into the user's user account. The user may instead or additionally be prompted when the user logs into his or her user account to select detected content consumption material he or she would like to add, if any.

In some embodiments, when database 512a receives a query from server 510a, database 512a uses information within the query, such as the purchase information, to cross-reference entries in database 512a to find matching results. Matching results may include database entries that are associated with the purchase information. Matching results are transmitted by database 512a back to control circuitry 304 of server 510a, such that control circuitry 304 is able to determine one or more user accounts associated with user 501a.

In some embodiments, database entries may correlate a device ID with a platform that UE device 504a operates on. The same entry or a different entry may correlate a list of content consumption material that is compatible with devices that utilize specific platforms.

FIG. 7 shows an illustrative embodiment of a database entry that details associations between device identifiers, platforms (e.g., makes and models) of UE devices, and what content consumption material (e.g., applications) is compatible with those UE devices, in accordance with some embodiments of the disclosure. Such entries may be stored on database 512 within storage 308, or on a separate and different database. Entry 700 includes items 702, 704, and 706, where item 702 lists UE device IDs, item 704 lists the make and model of the UE device ID, and item 706 lists applications that are compatible with that specific model. As an example, a newly purchased iPhone 4S may have a device ID A47629X6, which may be the serial number of the iPhone. The iPhone is compatible with some universal applications like Netflix and Hulu, but is not compatible with some proprietary applications like Google Play. As another example, a first generation Samsung Chromebook may be compatible with Google Play and SlingPlayer, but is not compatible with iTunes.

In some embodiments, compatibility entries 700 ensure that only information associated with content consumption material that is compatible with the purchased UE device are transmitted to the purchased UE device. For example, when database 512a receives a query from server 510a, database 512a uses information within the query, such as the UE device ID, to cross-reference entries in database 512a to find matching results. Matching results may include database entries that are associated with the device ID, such as an entry including a list of content consumption material that is compatible with UE device 504a, where UE device 504a corresponds to the UE device ID. Database 512b may narrow the matching results to include only content consumption material that is associated with the user account and then transmit the results to server 510b, or database 512b may transmit the acquired results to server 510b, which may then narrow the matching results to only include content consumption material that correspond to user 501*a*, perhaps by querying database 512*b* or a different database.

In some embodiments, a server receives information associated with a purchase and a UE device identifier when a UE device is purchased. The server may access a database to identify a user account associated with the purchase information. The identified user account may be associated with the UE device based on the UE device identifier by the server. A determination may then be made that the UE device is to be auto-configured, and, in response to the determination, the server may transmit information associated with the user account to the UE device.

Figure 8:
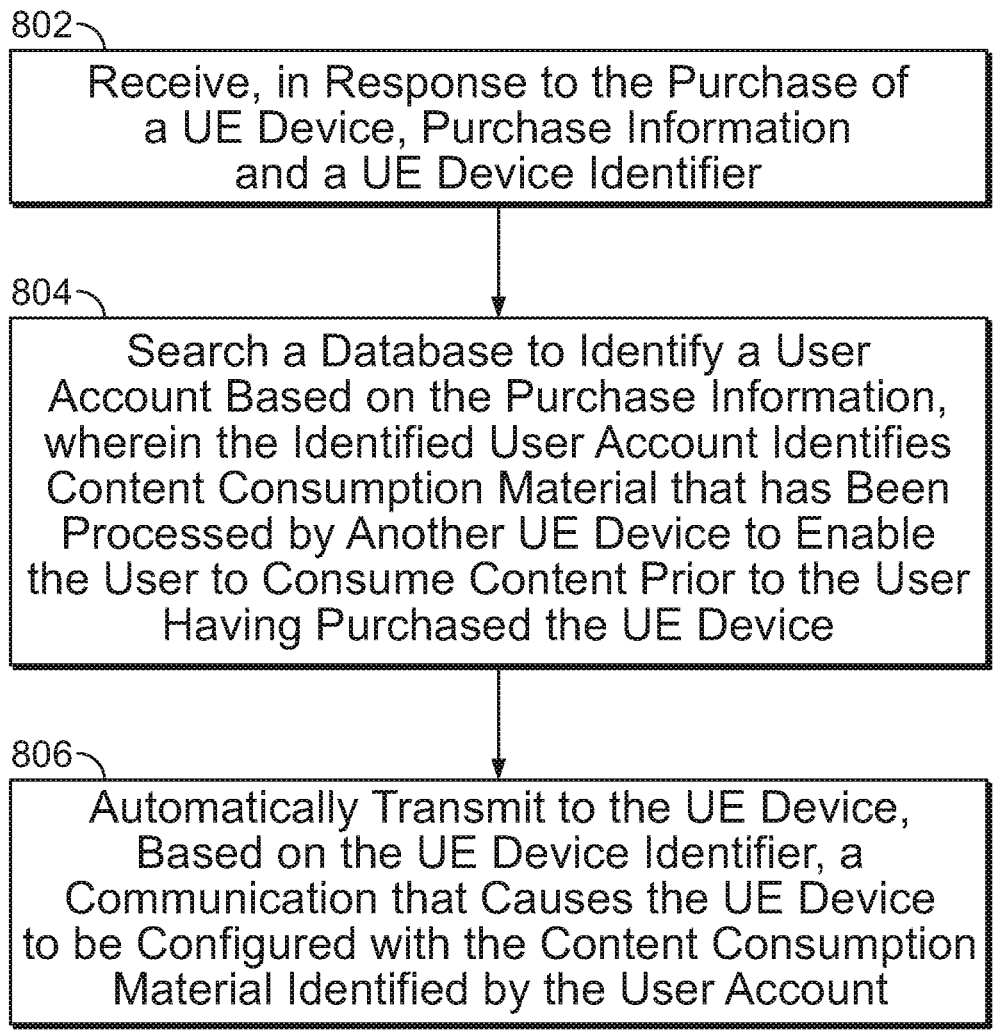
FIG. 8 is a flowchart of illustrative steps involved in identifying a user account based on information obtained when a UE device is purchased, and transmitting a communication to the UE device that causes the UE device to be configured with the content consumption material identified by the user account, in accordance with some embodiments of the disclosure.

FIG. 8 is a flowchart of illustrative steps involved in identifying a user account based on information obtained when a UE device is purchased, and transmitting information associated with the user account to the purchased UE device, in accordance with some embodiments of the disclosure. In step 802, a server may receive, in response to the user having purchased the UE device, a UE device ID associated with a UE device and purchase information. For example, server 510*a* may receive a serial number of a newly purchased computer, and a credit card number swiped by a cashier at cash register 506*a*, when user 501*a* purchases the computer.

In step 804, the server searches a database to identify a user account based on the received purchase information. In some embodiments, the server accesses the database via communications network 414. In other embodiments, the server is co-located with the database. The user account may identify content consumption material that has been processed by another UE device to enable the user to consume content prior to the user having purchased the UE device. The identified content consumption material may include user names, passwords, and information about subscriptions and applications that the purchaser has installed on other devices. For example, server 510*a* may access database 512*a* as to whether a user account associated with the purchase information exists, and if so, server 510*a* may learn from database 512*a* a user account number.

In step 806, the server may automatically transmit a communication to the UE device based on the UE device identifier, where the communication causes the UE device to be configured with the content consumption material identified by the user account. In some embodiments, server 510*a* transmits the communication in response to a user request to auto-configure UE device 504*a*. In some embodiments, server 510*a* transmits the communication when server 510*a* determines that UE device 504*a* has been powered on for the first time. In some embodiments, this determination is made by sending HELLO messages addressed to UE device 504*a* based on the device ID, such that when server 510*a* receives a response (e.g., an I'M HERE message), server 510*a* knows that UE device 504*a* has been powered on for the first time. In some embodiments, when UE device 504*a* is powered on for the first time, UE device 504*a* sends server 510*a* a request for information related to a user account for user 501*a*. Such an embodiment may avoid server 510*a* having to be burdened by sending HELLO messages periodically while UE device 504*a* is not capable of responding to the HELLO messages.

In some embodiments, when a UE device is to be auto-configured, a database is accessed to determine the platform of the UE device, such that only content consumption material that is compatible with that platform is configured on the device.

Figure 9:
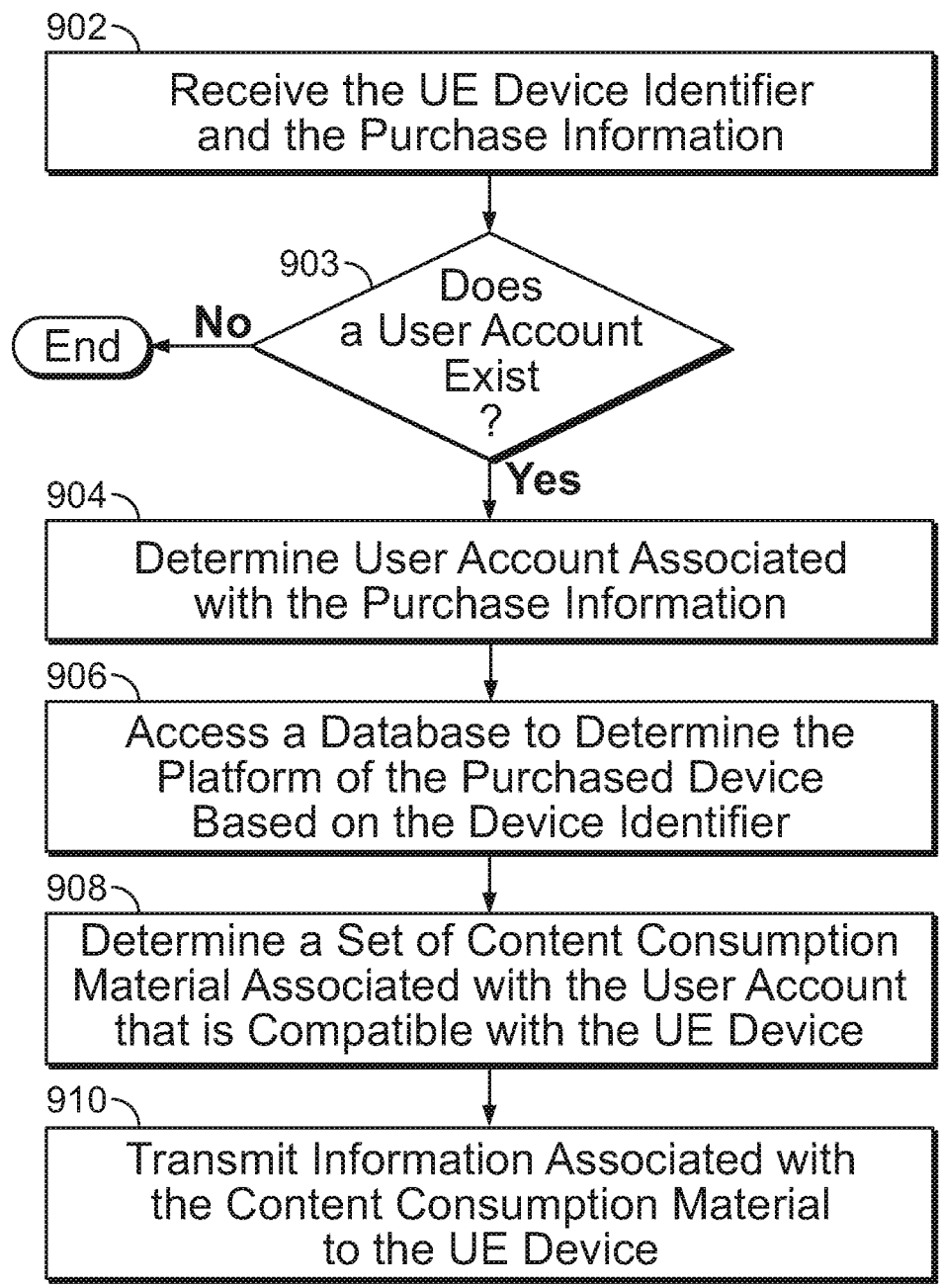
FIG. 9 is a flowchart of illustrative steps involved in identifying applications that are associated with the content consumption information associated with the user account that are compatible with the newly purchased UE device, in accordance with some embodiments of the disclosure.

FIG. 9 is a flowchart of illustrative steps involved in identifying content consumption material that is associated with the user account that is compatible with the newly purchased UE device, in accordance with some embodiments of the disclosure. In step 902, a UE device identifier and purchase information are received. For example, the device identifier and the purchase information may be received via transmitter 508*a* in response to a purchase of UE device 504*a* at a cash register 506*a*, the transmission occurring over communications network 414.

In step 903, control circuitry 304 determines whether a user account associated with the purchase information exists. For example, server 510*a* may query database 512*a* to determine whether a user account is associated with the purchase information.

In step 904, control circuitry determines a user account associated with the purchase information. For example, server 510*a* may query database 512*a* to determine a user account. This determination is made in accordance with the discussion made with regard to FIG. 5A.

In optional step 906, a database is accessed to determine the platform of the purchased UE device 504*a* based on the UE device identifier. In some embodiments, a platform may be associated with a make and/or model of UE device 504*a*. For example, entry 700 may be accessed by server 510*a* via communications network 414 to determine the make/model of UE device 504*a*, which may correspond to serial number A47629X6, as depicted in FIG. 7. Some platforms may correspond to entities that restrict a device's functionality to authorized and proprietary applications.

In optional step 908, a set of content consumption material associated with or identified by the user account that the UE device is compatible with is determined. This determination may be made by accessing a same or different database than the one accessed in step 906. For example, entry 700 may be accessed by server 510*a* via communications network 414 to determine a set of content consumption material that is compatible with a particular UE device ID, such as compatible applications 706. In some embodiments, determining what content consumption material that the UE device is compatible with may include determining the platform of the device, accessing a database to determine content consumption material associated with or identified by that platform, and then determining what content consumption material of the content consumption material that platform supports are associated with the user account.

In step 912, the server may determine that the UE device is to be auto-configured. In this case, control circuitry 304 may transmit information associated with the determined set of content consumption material to UE device 504*a*. For example, server 510*a* may transmit this information via communications network 414 to UE device 504*a*.

In some embodiments, a UE device may transmit a request to be auto-configured. The UE device may receive information associated with the user account, such that the UE device may be auto-configured based on the received information.

Figure 10:
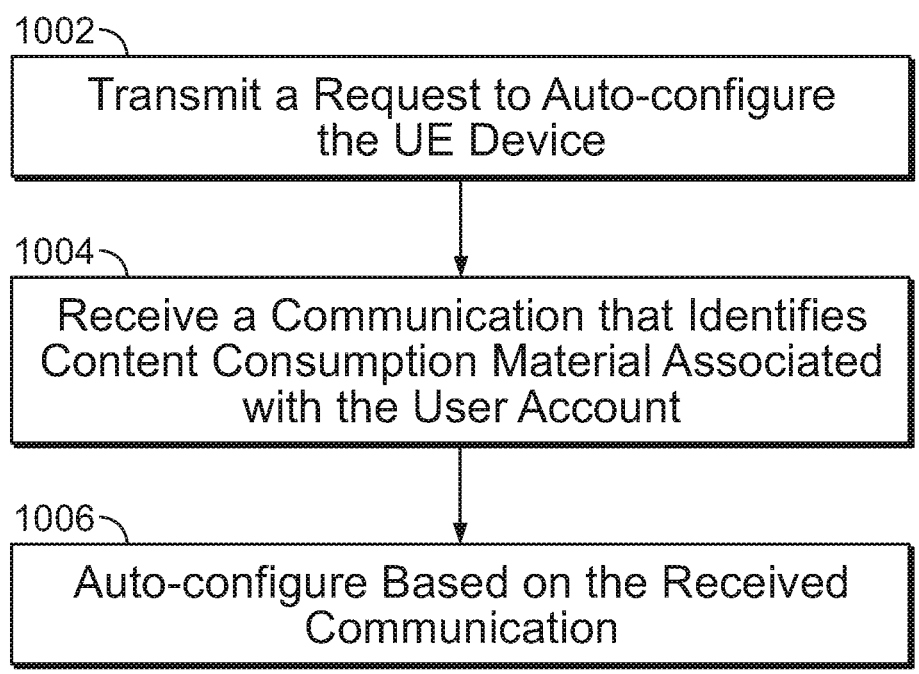
FIG. 10 is a flowchart of illustrative steps taken by the UE device when the UE device is to be auto-configured, in accordance with some embodiments of the disclosure.

FIG. 10 is a flowchart of illustrative steps taken by the UE device when the UE device has not been previously associated with the user account, in accordance with some embodiments of the disclosure. In step 1002, the UE device transmits a request to auto-configure the UE device. For example, UE device 504*a* may be powered on for the first time, upon which UE device 504*a* will receive a HELLO message from server 510*a*, and respond with an I'M HERE message via communications network 414.

In step 1004, the UE device receives a communication that identifies content consumption material associated with or identified by the user account. This information may include compatibility information, subscription information, login information, and the like. For example, UE device 504*a* may receive an indication of login information 606 associated with the user account from server 510*a* via communications network 414. Such information may be received from server 510*a* and/or from one or more other servers.

In step 1006, the UE device auto-configures based on information received in step 1004. In some embodiments, UE device 504*a* may use control circuitry 304 to automatically modify web browser settings or set cookies such that user 501*a*'s login information for services associated with user 501*a*'s user account are automatically loaded. In some embodiments, control circuitry 304 may automatically access application provider servers to download installation files related to applications, and then automatically execute the downloaded installation files. In some embodiments, control circuitry 304 may cause a user to be prompted through display 312 to select only a subset of the applications or login information associated with the user account. The flowchart of server functions described in FIG. 8 is closely associated with the function of FIG. 10, and as such, all embodiments described with regard to FIG. 8 are equally applicable to the functions associated with the flowchart of FIG. 10.

In some embodiments, when the UE device is to be auto-configured, the UE device processes a communication from the server to identify content consumption material identified by the user account. For example, the UE device may discover a set of content consumption material associated with or identified by the user account that is compatible with the UE device. The UE device may then determine what applications of the discovered set of content consumption material are not already configured on the UE device, and have each such application installed, thus enabling the user to consume content corresponding to those applications when the user first uses the device.

Figure 11:
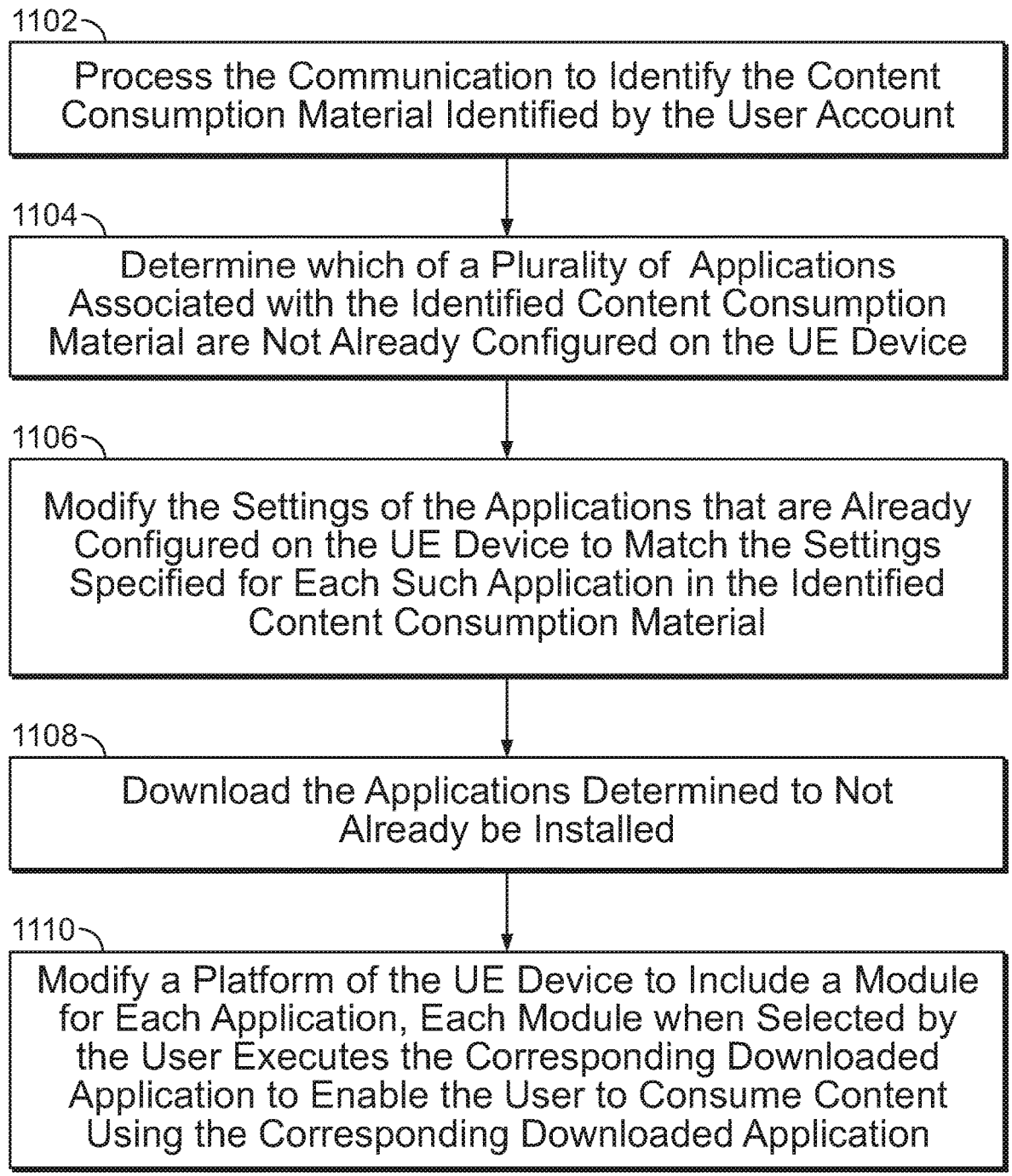
FIG. 11 is a flowchart of illustrative steps taken by the UE device to configure the UE device upon receiving a communication from the server, in accordance with some embodiments of the disclosure.

FIG. 11 is a flowchart of illustrative steps taken by the UE device to configure the UE device upon receiving a communication from the server, in accordance with some embodiments of the disclosure. In step 1102, the UE device processes the communication to identify the content consumption material identified by the user account. For example, control circuitry 304 is used to process the content consumption material.

In step 1104, the UE device determines which of a plurality of applications associated with the identified content consumption material are not already configured on the UE device. For example, control circuitry 304 is used to determine whether any of the content consumption material identified by the user account is pre-existing on UE device 504*a* (e.g., due to default settings).

In step 1106, the UE device modifies the settings of any pre-installed applications to match the settings specified for each such application in the identified content consumption material, if such settings are in fact specified. For example, if calendar application 204*b* is an application of the identified content consumption material, and is pre-installed on UE device 504*a*, then the calendar application may be automatically modified to include user 501*a*'s preferences within the calendar.

In step 1108, the UE device downloads the applications determined to not already be installed on the UE device. For example, UE device 504*a* downloads the applications via communications network 414 and stores the applications on storage 308.

In step 1110, the platform of the UE device is modified to include a module for each application, such that when modules are selected by the user, the corresponding application is executed such that the user can consume content using that corresponding application. For example, when a user selects module 208*b* using user input interface 310, a music application (e.g., iTunes) is executed and the user is enabled to consume music.

It will be apparent to those of ordinary skill in the art that methods involved in the present invention may be embodied in a computer program product that includes a computer usable and/or readable medium. For example, such a computer usable medium may consist of a read only memory device, such as a CD-ROM disk or conventional ROM devices, or a random access memory, such as a hard drive device or a computer diskette, having a computer readable program code stored thereon. It should also be understood, that methods, techniques, and processes involved in the present invention may be executed using processing circuitry. For instance, determination of a user account as described herein may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 108 or one of servers 122 of FIG. 1. For example, the user account information may be stored in, and retrieved from, storage 308 of FIG. 3, or media guidance data source 418 of FIG. 4. Furthermore, processing circuitry, or a computer program, may update the profiles by updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

What is claimed is:

1. A method for automatically configuring user equipment that a user has newly purchased with applications used by the user on different user equipment, the method comprising:
    determining, at the user equipment, that the user equipment is unconfigured;
    based on determining that the user equipment is unconfigured, transmitting a query to a database storing user information requesting an identification of the user to be transmitted to the user equipment;
    receiving a response to the query with the identification of the user;
    based on receiving the response, transmitting a request comprising the identification to identify the applications used by the user on different user equipment by:
        transmitting a unique identifier, wherein the unique identifier contains an identity of a transaction application used by the user to acquire the user equipment and a user device identifier; and
        transmitting an indication that a user account for the user exists;
    determining a subset of the applications that is compatible with the user equipment;

determining which of the applications of the subset are not already installed on the user equipment;

automatically downloading the applications determined to not already be installed; and modifying a platform of the user equipment to include a module for each downloaded application, each module when selected by the user executes the corresponding downloaded application to enable the user to consume content using the corresponding downloaded application.

2. The method of claim 1, wherein receiving a response to the query with the identification of the user comprises receiving a user account for the user.

3. The method of claim 2, further comprising generating a prompt for the user, wherein the prompt displays a list of at least one application associated with the user account for the user to select to install on the user equipment.

4. The method of claim 1, wherein the user equipment identifier is at least one of a serial number of the user equipment, an IP address of the user equipment, a unique indicator of the user equipment, and a MAC address of the user equipment.

5. The method of claim 1, wherein determining which of the applications of the subset are not already installed on the user equipment comprises:

comparing each application of the subset with default applications preconfigured on the user equipment; and determining, from the comparison, each application of the subset of applications that is not already installed on the user equipment.

6. The method of claim 1, wherein automatically downloading the applications determined to not already be installed comprises:

automatically retrieving, from a server, installation files related to the applications determined not to already be installed; and automatically executing the retrieved installation files.

7. The method of claim 1, further comprising receiving an indication, wherein the indication indicates that the user equipment device will be automatically configured.

8. The method of claim 7, wherein receiving the indication comprises:

determining that at least one of the of the following determinations has been made:

determining that the user equipment has been powered on for a first time;

determining that the user equipment is configured with factory settings;

determining that the user equipment has accessed the Internet for the first time;

determining additional user login information has been registered to the user equipment for the first item; and determining a user request has been received.

9. The method of claim 1, further comprising:

retrieving a preinstalled application on the user equipment; and automatically modifying the preinstalled application based user preferences determined from the identification.

10. A system for automatically configuring user equipment that a user has newly purchased with applications used by the user on different user equipment, the system comprising:

control circuitry configured to:

determine, at the user equipment, that the user equipment is unconfigured;

based on determining that the user equipment is unconfigured, transmit a query to a database storing user information requesting an identification of the user to be transmitted to the user equipment;

receive a response to the query with the identification of the user;

based on receiving the response, transmit a request comprising the identification to identify the applications used by the user on different user equipment by:

transmitting a unique identifier, wherein the unique identifier contains an identity of a transaction application used by the user to acquire the user equipment and a user device identifier; and transmitting an indication that a user account for the user exists;

determine a subset of the applications that is compatible with the user equipment;

determine which of the applications of the subset are not already installed on the user equipment;

automatically download the applications determined to not already be installed; and modify a platform of the user equipment to include a module for each downloaded application, each module when selected by the user executes the corresponding downloaded application to enable the user to consume content using the corresponding downloaded application.

11. The system of claim 10, wherein the control circuitry is configured to receive a response to the query with the identification of the user by receiving a user account for the user.

12. The system of claim 11, wherein the control circuitry is further configured to generate a prompt for the user, wherein the prompt displays a list of at least one application associated with the user account for the user to select to install on the user equipment.

13. The system of claim 10, wherein the user equipment identifier is at least one of a serial number of the user equipment, an IP address of the user equipment, a unique indicator of the user equipment, and a MAC address of the user equipment.

14. The system of claim 10, wherein the control circuitry is further configured to determine which of the applications of the subset are not already installed on the user equipment by:

comparing each application of the subset with default applications preconfigured on the user equipment; and determining, from the comparison, each application of the subset of applications that is not already installed on the user equipment.

15. The system of claim 10, wherein the control circuitry is configured to automatically download the applications determined to not already be installed by:

automatically retrieving, from a server, installation files related to the applications determined not to already be installed; and automatically executing the retrieved installation files.

16. The system of claim 10, wherein the control circuitry is further configured to receive an indication, wherein the indication indicates that the user equipment device will be automatically configured.

17. The system of claim 16, wherein the control circuitry is configured to receive the indication by:

determining that at least one of the of the following determinations has been made:

determining that the user equipment has been powered on for a first time;

determining that the user equipment is configured with factory settings;

determining that the user equipment has accessed the Internet for the first time;

determining additional user login information has been registered to the user equipment for the first item; and determining a user request has been received.

18. The system of claim 10, wherein the control circuitry is further configured to:

retrieve a preinstalled application on the user equipment; and automatically modify the preinstalled application based user preferences determined from the identification.

* * * * *